(12) United States Patent
Canter

(10) Patent No.: US 6,528,901 B1
(45) Date of Patent: Mar. 4, 2003

(54) AUTOMATIC PROTECTION SWITCHING

(75) Inventor: Jeffrey B. Canter, West Orange, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/454,579

(22) Filed: Dec. 7, 1999

(51) Int. Cl.[7] .................................................. G06F 11/00
(52) U.S. Cl. .......................................... 307/11; 700/82
(58) Field of Search ........................ 307/11, 39; 700/79, 700/82, 11, 12; 714/10, 11; 709/209

(56) References Cited

U.S. PATENT DOCUMENTS

| 4,351,023 | A | * | 9/1982 | Richer ......................... 700/82 |
| 5,155,729 | A | * | 10/1992 | Rysko et al. ................... 714/11 |
| 5,313,386 | A | * | 5/1994 | Cook et al. .................... 700/82 |
| 5,508,910 | A | * | 4/1996 | Diehl ............................ 700/82 |
| 5,544,304 | A | * | 8/1996 | Carlson et al. ................. 700/11 |
| 5,570,345 | A | * | 10/1996 | Kaprielian et al. ............. 714/2 |
| 5,644,700 | A | * | 7/1997 | Dickson et al. ................ 700/79 |
| 5,737,404 | A | * | 4/1998 | Segal .......................... 370/217 |
| 5,777,874 | A | * | 7/1998 | Flood et al. .................... 700/82 |
| 5,870,382 | A | * | 2/1999 | Tounai et al. ................. 370/220 |
| 5,958,069 | A | * | 9/1999 | Kawasaki et al. ............. 714/11 |
| 5,966,300 | A | * | 10/1999 | Flood et al. .................... 700/82 |
| 6,002,970 | A | * | 12/1999 | Abdelnour et al. ............ 700/82 |
| 6,047,222 | A | * | 4/2000 | Burns et al. .................... 700/82 |
| 6,061,599 | A | * | 5/2000 | Rhodehamel et al. ......... 700/82 |
| 6,061,601 | A | * | 5/2000 | Jansen et al. .................. 700/82 |
| 6,298,376 | B1 | * | 10/2001 | Rosner et al. .............. 709/209 |
| 6,363,416 | B1 | * | 3/2002 | Naeimi et al. .............. 709/209 |

FOREIGN PATENT DOCUMENTS

EP 1158816 A2 * 11/2001 ............ H04Q/3/00

* cited by examiner

Primary Examiner—Stephen W. Jackson
Assistant Examiner—Roberto J. Rios
(74) Attorney, Agent, or Firm—Steve Mendelsohn

(57) ABSTRACT

In a system that has a redundant pair of modules where one module is the active module and the other module is the standby module, each of the two modules includes equipment such as an inexpensive programmable logic device to provide a protection switching algorithm for determining, at the individual module level, whether a module is in the active or standby state and switching a module from a standby state to its active state when the module in the active state becomes defective. The number of wires that are required as module to module indicators is reduced to two. The processor can make the active, standby determination when the two modules are powered up simultaneously, when one module is inserted subsequent to the other, or where a module has been active and then fails or is unexpectedly removed.

14 Claims, 2 Drawing Sheets

AUTOMATIC PROTECTION SWITCHING

BACKGROUND OF THE INVENTION

1. Field of the Invention

This invention relates to a class of equipment known as protected equipment. There are many examples of protected equipment in systems, particularly electronic systems, and more particularly communications systems.

2. Description of the Prior Art

There are many different types of equipment in a class called protected equipment. This class of equipment attempts to achieve an increase in reliability and availability of its features to its customers by structuring its implementation. This structure is realized as redundant sets of modules which are subparts of the equipment and which implement functions of the equipment. This equipment is structured and controlled such that there are redundant modules for each feature or group of features of importance for the equipment. In this structure there are at least two modules which can implement each important function. These modules are normally referred to as redundant modules or redundant module sets. Protected equipment solutions are constructed of one or more sets of these redundant modules. The premise for this structure is that if the currently active one of these sets fails, the other identical set which was not active can be quickly substituted for the failed set and the equipment can resume providing service to its customer.

A methodology and mechanism is required to control and communicate information regarding the control of the function that decides which of the redundant sets is going to be the active set. When this function is structured to operate without intervention of separate equipment or personnel entity, it is commonly referred to in the art as automatic protection switching (APS). When used in reference to communication facility protection, it has as a subset what is commonly called equipment protection switching (EPS) which is used for the protection of the equipment modules. The switching decisions can be made by a central controller, however, a mechanism to communicate with a central controller and the queuing associated with the central controller multi-tasking solutions can add delay in the reconfiguration of the equipment to restore customer service which is lost when the active module of a redundant module set fails. Also, if the system controller fails or is removed, the ability to perform the reconfiguration process will be lost.

Automatic protection systems for network elements in the past have comprised, for example, redundant facility equipment wherein a detected failure in one of the redundant sides will cause a switch over from one redundant side to the other. In such a switch over the entire line of protection equipment on one side is substituted for the other, even if a failure occurred in only one module in the working channel. This approach is somewhat inflexible in that it fails to maximize the available equipment.

Moreover, the switching decision is typically made by the system controller and all the information relevant to the switch over decision then has to be sent to the system controller. Since the system controller services all the information in the system, a large number of connections are required to be made through the back plane and the time required to effect the switch over can be relatively long. In addition, all the elements on the data path need to be switched during a switch over.

Thus, a better automatic protection switching system is desired.

SUMMARY OF THE INVENTION

In a system that has a redundant pair of modules where one module is the active module and the other module is the standby module, each of the two modules comprises equipment such as an inexpensive programmable logic device or processor to provide a protection switching algorithm for determining, at the individual module level, whether a module is in the active or standby state and switching a module from a standby state to its active state when the module in the active state becomes defective. This reduces the number of wires that are required as module to module indicators to two. The processor can make the determination of which module is in the active state and which is in the standby state when the two modules are powered up simultaneously, when one module is inserted subsequent to the other, or where a module has been active and then fails or is unexpectedly removed.

DETAILED DESCRIPTION

Figure 1:
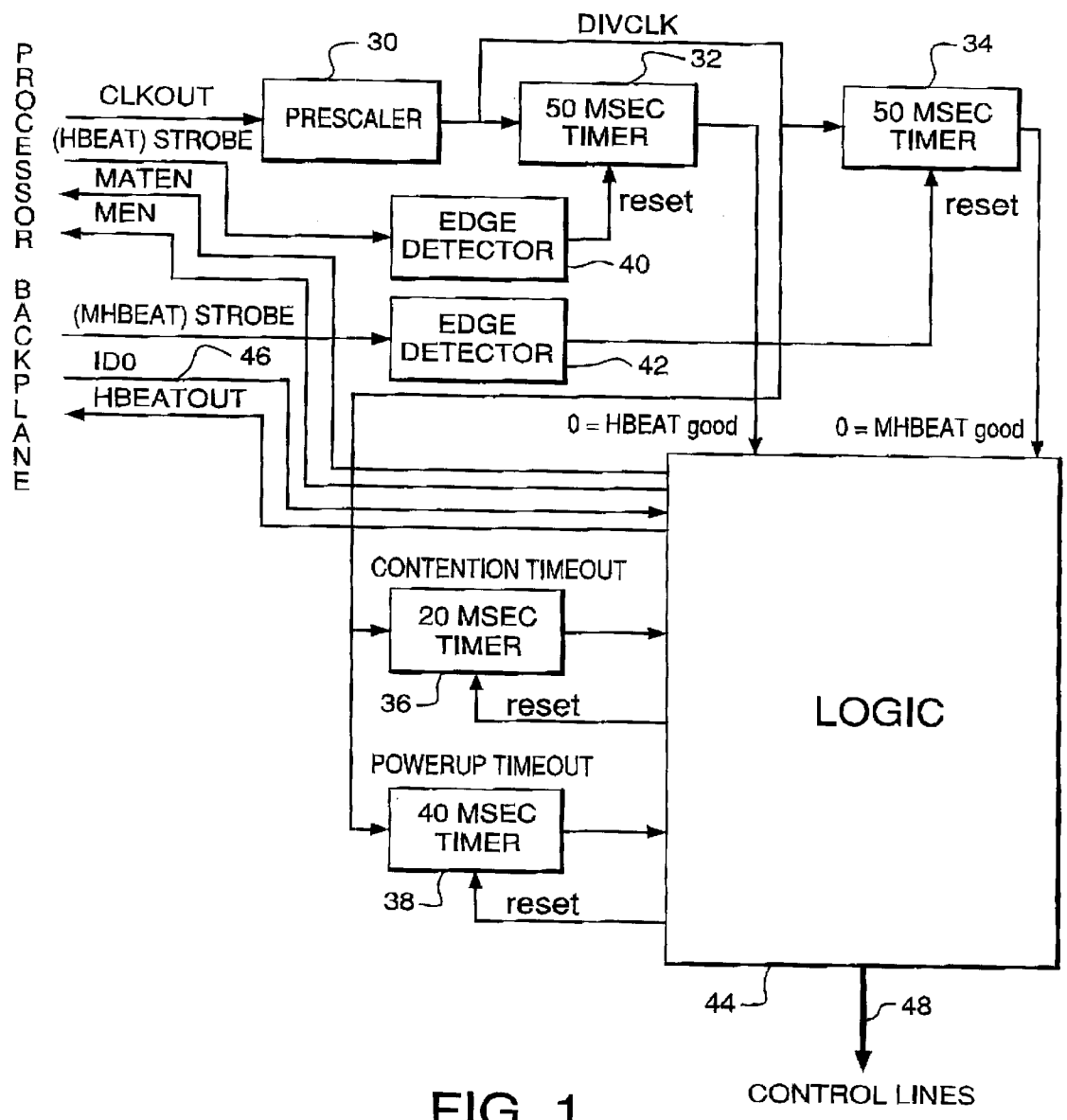
FIG. 1 is a block diagram of the equipment in accordance with the principles of the invention for determining whether a module is in its active or standby state and for substituting the standby module for an active but defective module; and, FIG. 2 is a flowchart of the algorithm for the block diagram of FIG. 1.

In this invention, two modules designed to perform identical functions are examined to determine which one of the two modules is in the active state. Based on this determination, the module that is found to be the active module is given access to designated interfaces of the network. The process of determining which module is active should be flexible enough to operate under various conditions such as where two modules are powered up simultaneously, or where one module is subsequently inserted into its socket and powered up, or where an active module suddenly fails or is unexpectedly removed.

The process of identifying the active module is implemented as a state machine which has two timers that are reset by software. However, no resets are issued when the software strobe signal is missing and a soft switch will be performed by the software intentionally withholding the strobe.

Two wires pass between the two modules and the back plane and carry, under certain conditions, a software strobe which, for purposes of explanation is here referred to as a "heartbeat". A processor, which is a part of each module produces its own heartbeat which is sent to the protection equipment on that module. The equipment retransmits this heartbeat over the back plane to represent one of two states, either the active capable state or the active state.

A more complete understanding of the invention can be obtained from the following example. Assume that two modules have been inserted into sockets on a shelf, and the shelf is subsequently powered up. On power up, the protection equipment on each module transitions to a first state, called power up. The power up state is only entered after a hard reset. During the power up state, the equipment on the module will listen for the occurrence of a strobe signal (heartbeat) from its mate. It will remain in this state until (1) it hears the mate heartbeat, or (2) the power up timer times out. The power up timer is designed to give the mate at least two chances to reset the timer, but not long enough for a module which has just been powered up to produce the first heartbeat. If before time out the mate heartbeat is heard, the module will jump to the standby state. During the power up state, the module will not transmit its own heartbeat over the back plane.

If the power up timer times out, the protection equipment will move to the start state. During the start state the equipment will listen for both the mate heartbeat and its own. Additionally, if it hears its own heartbeat, it will transmit the heartbeat over the back plane. This represents the active capable strobe signal. There are three possible scenarios that can result from the time spent in this state. The first is that the equipment hears its own heartbeat and not its mate's heartbeat. If it hears its own heartbeat first, it will wait enough time to allow the mate to strobe once to ensure that the mate did not power up simultaneously and the backplane delay caused the heartbeat to be missed. Since, by this time, more than enough time has elapsed for the mate to initialize, the equipment will assume that there is no mate and jump to the active state. The second scenario is that the equipment hears the mate's heartbeat but not its own. In this case, the equipment will assume that the software residing on the module is not working properly, and will jump to the standby state. The third case is where the equipment hears both its own and its mate's heartbeats, which commonly occurs when both modules are powered simultaneously. In this case, the equipment will examine the back plane slot identification (ID). The module in the odd slot will become active.

Once a module declares itself active, it will remain active unless its own heartbeat fails. Only a active module will transmit a heartbeat over the back plane. This serves two purposes: the mate module will monitor the heartbeat and, if it fails to hear a heartbeat, will take over. Additionally, a mate that is plugged in subsequently will hear the heartbeat during its power up state and jump to the standby state. During the standby state, the module will not transmit a heartbeat. The module cannot leave the standby state unless the mate heartbeat fails.

Referring to FIG. 1, there is illustrated a block diagram of structure for performing the various functions for automatically identifying which module of a redundant pair of modules is active and for switching from the active module to a standby module when the active module becomes defective.

A programmable logic device (PLD) such as the Altera PLD #7256, which is manufactured by Altera Corp. located in Milpitas, Calif., is made a part of the equipment of each module and is programmed to perform the functions of the blocks of FIG. 1. A prescaler 30 is connected to receive the system clock pulse signal, which may be 25 MHz, and, in this case, reduces it to 100 Hz to obtain a clock signal having pulse widths of 10 ms. The 10 ms. pulse signal is fed to two 50 ms. timers 32, 34 which are on continuously, and to a 20 ms. timer 36 and a 40 ms. timer 38, each of which is on only when the power is first turned on. An edge detector 40 is coupled to receive the heartbeat signal of its module, and edge detector 42 is coupled to receive the heartbeat signal of the redundant or mate module. The output signal of edge detector 40 is connected to the reset terminal of timer 32, and the output signal of edge detector 42 is connected to the reset terminal of timer 34. The output signals of timers 32, 34 are fed to the logic section of the equipment, hereafter referred to as "logic" 44, which is programmed to automatically identify and determine which one of the redundant set of modules is the active module and to automatically switch a redundant module from its standby state to its active state when its mate malfunctions. The output signal of timer 36, which is the contention time out signal, is fed to logic 44, and the output signal of timer 38, which is the power up time out signal, is fed to logic 44. The reset signals for the timers 36, 38 are generated by logic 44. In some instances where the strobe signal from each of the redundant modules is received simultaneously, logic 44 will look at the ID0 to determine which module is to become the active module and which is to be the standby module. ID0 is the least significant bit of the ID (identification) pins on the backplane. In the implementation of this invention, it was arbitrarily determined that the module in the odd slot (ID0=1) will become the active module. It is to be understood that, in this instance, any convenient method may be used to determine which module is to be the active module. The ID pin is read on conductor 46 to logic 44. The output signal from logic 44 appears on conductor 48 and is used to control the protected interfaces.

Figure 2:
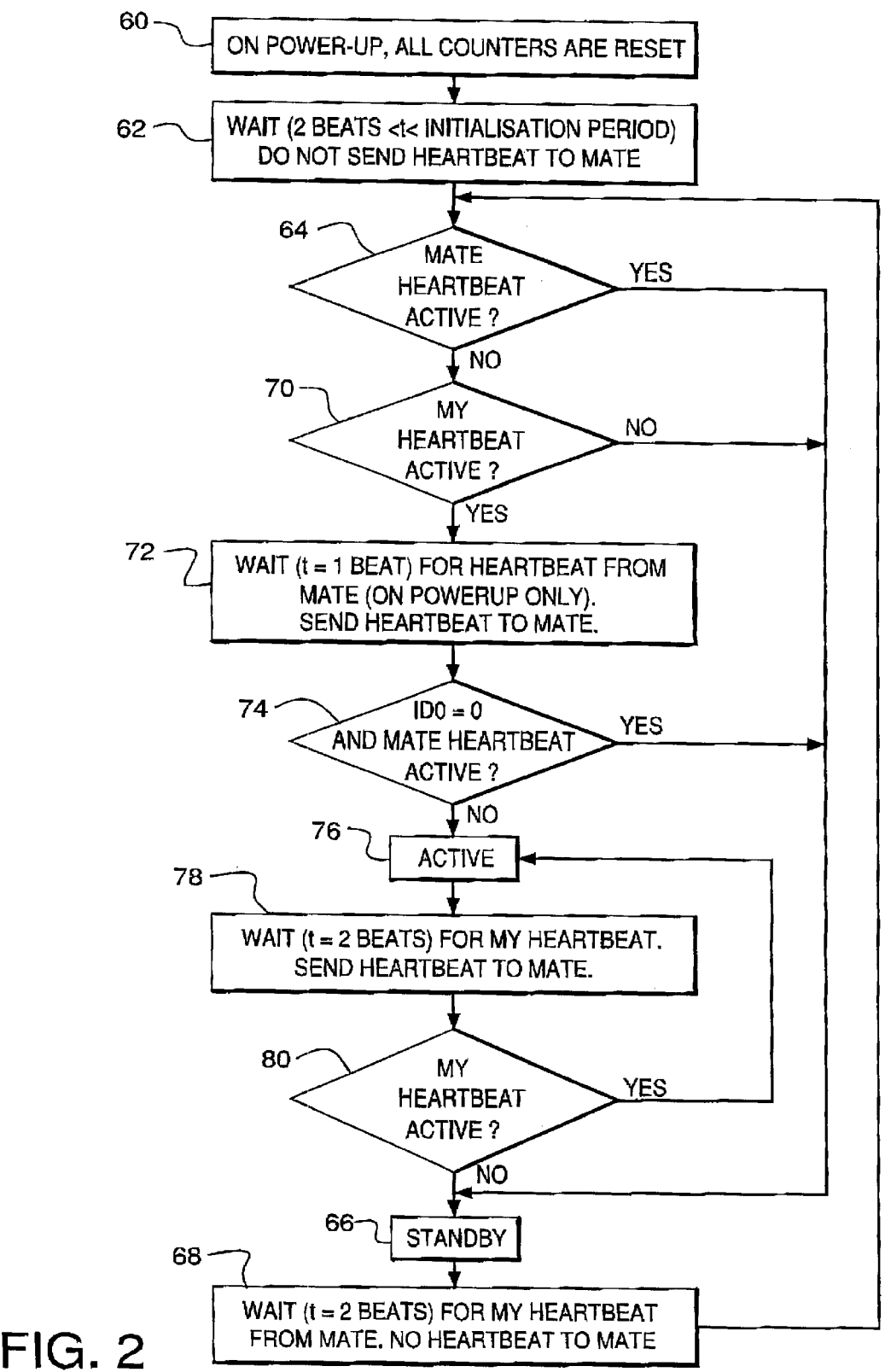

Referring to FIG. 2, there is illustrated a flowchart of the control process illustrated in FIG. 1 for determining automatically which module of a redundant pair of modules is the active module and, when required, for switching the standby module to its active state when the active module becomes inoperative.

In the implementation of this invention, each module of a redundant pair of modules supports equipment for generating the module identification and switching algorithm. For purposes of explanation, the redundant module pair will be identified as the "prime module" and the "mate module". In the explanation of the sequence of steps of the logic as illustrated by the flow chart of FIG. 2, it is understood that the flow chart is for the programmable logic device of the equipment on the prime module. On power up, all counters 32, 34, 36 and 38 are reset (step 60). The counter 38 waits 40 msec. (step 62) to allow the mate module, if present, time to send a strobe signal over the back plane to edge detector 42 which will send a reset pulse to timer 34. The timer output (1=not reset, 0=reset) is sampled by logic 44.

During this initial interval, the prime module does not send a strobe signal to its mate module. If during this initial 40 msec. period a strobe signal is received from the mate module (step 64), it is assumed that the mate module is currently active and the prime module goes immediately into the standby mode (step 66) where it will stay until the strobe signal from the mate module disappears for more than 50 msecs. (step 68).

If, however, when the prime and mate modules are powered up simultaneously and no strobe signal is received by the prime module from the mate module, the logic looks for its own strobe signal (step 70).

If the prime module does not detect its own strobe signal (heartbeat), it immediately goes into its standby state. If, however, the prime module does detect its own strobe signal, it sends its strobe signal (heartbeat) to its mate module (step 72) and, at the same time, waits 20 msec. for the receipt of a strobe signal (heartbeat) from the mate module before becoming active. This 20 msec. delay is to prevent a start up race condition from occurring between the prime module and the mate module. If the prime module logic receives no strobe signal (heartbeat) from the mate module (step 74), it assumes that no mate module is installed and goes into its active state (step 76). While in the active state, it will continue to monitor its own heartbeat (step 78) remaining active as long as its heartbeat is received (step 80) or going to standby if the heartbeat is lost. If the mate module is installed subsequently, it will receive a strobe signal (heartbeat) from the active prime module and the mate module will go to its standby state. If the logic of the prime module receives both its own strobe signal (heartbeat) and a strobe signal (heartbeat) from its mate module, it will use the first slot bit of the slot ID to determine which module is to become the active module and which is to become the standby module. For convenience, the module in the odd slot (ID0=1) is here designated to become the active module. Once designated to be the active module, it will send a strobe signal (heartbeat) over the back plane to the standby module and will remain active unless it fails to receive the strobe signal (its heartbeat). In standby, the module will not send a strobe signal over the back plane and will remain in standby unless it fails to receive a strobe signal (heartbeat) from the active module.

Although the present invention has been described in terms of the presently preferred embodiments, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

The invention claimed is:

1. A method of determining which one of a redundant pair of modules, a prime module or a mate module is going to be in an active state at power up where each module is capable of assuming an active state or a standby state and includes equipment for providing a protection switching algorithm, the method comprising the steps of:

setting the equipment on the prime module to detect a strobe signal from the mate module for a fixed interval of time;

preventing the equipment on the prime module from sending a strobe signal to the mate module during the fixed interval of time; and conditioning the equipment on the prime module to put the prime module into its standby state upon receiving a strobe signal from the mate module within the fixed interval of time.

2. The method of claim 1, further comprising the step of:

setting the fixed interval of time to be less than the time required for the equipment on a module which has just been powered up to generate its own strobe signal.

3. The method of claim 2, further comprising the steps of:

enabling the equipment on the prime module and the mate module each to transmit strobe signals in the event that neither the equipment on the prime module or the mate module received a strobe signal during the fixed interval of time; and setting the first module that receives a strobe signal to its standby state and the other module to its active state.

4. The method of claim 3, further comprising the step of:

preventing the equipment on the module that is in the standby state from transmitting additional strobe signals.

5. The method of claim 4, further comprising the step of:

enabling the module that is in the standby state to begin transmitting strobe signals in the event the module in the standby state fails to receive a strobe signal from the module in the active state.

6. In a prime module configured to communicate with a mate module, where each module is capable of assuming an active state or a standby state, protection switching equipment comprising:

(a) a logic device configured to determine whether the prime module is to be in the active state or the standby state, wherein the prime module transmits strobe signals to the mate module when the prime module is in the active mode;

(b) a prime strobe timer configured to provide an output signal to the logic device indicating whether a strobe signal has been generated by the prime module within a first time interval; and (c) a mate strobe timer configured to provide an output signal to the logic device indicating whether a strobe signal has been received from the mate module within a second time interval, wherein:

the logic device processes the output signals from the prime and mate strobe timers to determine whether the prime module is to be in the active state or the standby state.

7. The equipment of claim 6, wherein the first and second time intervals are the same.

8. The equipment of claim 6, further comprising:

(d) a powerup timer configured to provide an output signal to the logic device indicating the expiration of a third time interval following power up of the prime module, wherein the logic device processes the output signal from the powerup timer to determine whether the prime module is to be in the active state of the standby state at power up.

9. The equipment of claim 8, wherein the powerup timer is reset by the logic device.

10. The equipment of claim 8, wherein the third time interval is shorter than the first and second time intervals.

11. The equipment of claim 6, further comprising:

(d) a contention timer configured to provide an output signal to the logic device indicating the expiration of a fourth time interval, wherein the logic device processes the output signal from the contention timer to prevent a start up race condition from occurring between the prime module and the mate module.

12. The equipment of claim 11, wherein the contention timer is reset by the logic device.

13. The equipment of claim 11, wherein the fourth time interval is shorter than the first and second time intervals.

14. The equipment of claim 11, further comprising:

(e) a powerup timer configured to provide an output signal to the logic device indicating the expiration of a third time interval following power up of the prime module, wherein:

the logic device processes the output signal from the powerup timer to determine whether the prime module is to be in the active state of the standby state at power up;

the contention and powerup timers are reset by the logic device; and the third and fourth time intervals are shorter than the first and second time intervals.

* * * * *